US009461293B2

(12) United States Patent
Ochi

(10) Patent No.: US 9,461,293 B2
(45) Date of Patent: Oct. 4, 2016

(54) POWER SOURCE APPARATUS HAVING BUS-BARS

(71) Applicant: SANYO ELECTRIC CO., LTD., Osaka (JP)

(72) Inventor: Shingo Ochi, Takasago (JP)

(73) Assignee: SANYO ELECTRIC CO., LTD., Osaka (JP)

(\*) Notice: Subject to any disclaimer, the term of this patent is extended or adjusted under 35 U.S.C. 154(b) by 347 days.

(21) Appl. No.: 13/956,822

(22) Filed: Aug. 1, 2013

(65) Prior Publication Data

US 2013/0316200 A1 Nov. 28, 2013

Related U.S. Application Data

(62) Division of application No. 12/978,803, filed on Dec. 27, 2010, now abandoned.

(30) Foreign Application Priority Data

Dec. 28, 2009 (JP) ................................ 2009-296705

(51) Int. Cl.
*H01M 2/20* (2006.01)
*H01M 2/10* (2006.01)
(Continued)

(52) U.S. Cl.
CPC ............ *H01M 2/206* (2013.01); *B60L 3/0046* (2013.01); *B60L 11/126* (2013.01); *B60L 11/1864* (2013.01); *B60L 11/1874* (2013.01); *B60L 11/1877* (2013.01); *B60L 11/1879* (2013.01); *H01M 2/1077* (2013.01);
(Continued)

(58) Field of Classification Search
CPC .............................. H01M 2/20; H01M 2/206
See application file for complete search history.

(56) References Cited

U.S. PATENT DOCUMENTS 4,001,490 A    1/1977   Lynch
5,849,431 A    12/1998  Kita et al.
(Continued)

FOREIGN PATENT DOCUMENTS

CN    1767245       5/2006
CN    201270264     7/2009
(Continued)

OTHER PUBLICATIONS

JP 2008-091183 MT.*
(Continued)

*Primary Examiner* — Patrick Ryan
*Assistant Examiner* — Alex Usyatinsky
(74) *Attorney, Agent, or Firm* — Wenderoth, Lind & Ponack, L.L.P.

(57) ABSTRACT

A power source apparatus including batteries having positive and negative electrode regions, parallel blocks with batteries stacked together and electrically connected in parallel, multiple parallel-series connected blocks with the parallel blocks electrically connected in series, and bus-bars having a plurality of terminal insertion holes. Batteries in a parallel block are stacked together lining-up positive electrode regions on one side and negative electrode regions on the other side. Parallel blocks in a multiple parallel-series connected block are stacked so as to reverse the orientation of each block added to the stack. The bus-bars are integrated pieces that can electrically connect the batteries in a parallel block in parallel as well as electrically connect the parallel blocks in series.

14 Claims, 11 Drawing Sheets

(51) Int. Cl.
   H01M 10/42     (2006.01)
   H01M 10/48     (2006.01)
   B60L 3/00      (2006.01)
   B60L 11/12     (2006.01)
   B60L 11/18     (2006.01)
   H01M 2/30          (2006.01)
   H01M 10/052        (2010.01)
   H01M 10/625        (2014.01)
   H01M 10/6563       (2014.01)
   H01M 10/647        (2014.01)
   H01M 10/613        (2014.01)

(52) U.S. Cl.
   CPC ....... H01M 10/425 (2013.01); H01M 10/482 (2013.01); *B60L 2210/30* (2013.01); *B60L 2210/40* (2013.01); *B60L 2240/36* (2013.01); *B60L 2240/421* (2013.01); *B60L 2240/441* (2013.01); *B60L 2240/545* (2013.01); *B60L 2270/145* (2013.01); *H01M 2/305* (2013.01); *H01M 10/052* (2013.01); *H01M 10/613* (2015.04); *H01M 10/625* (2015.04); *H01M 10/647* (2015.04); *H01M 10/6563* (2015.04); *Y02T 10/6217* (2013.01); *Y02T 10/642* (2013.01); *Y02T 10/7005* (2013.01); *Y02T 10/7011* (2013.01); *Y02T 10/7061* (2013.01); *Y02T 10/7077* (2013.01); *Y02T 10/7241* (2013.01)

(56) References Cited

U.S. PATENT DOCUMENTS

| | | | | |
|---|---|---|---|---|
| 2005/0209747 | A1* | 9/2005 | Yakes | B60K 6/46 701/22 |
| 2006/0091855 | A1  | 5/2006 | Seo | |
| 2006/0127754 | A1* | 6/2006 | Hamada | H01M 2/206 429/158 |
| 2008/0118819 | A1  | 5/2008 | Gamboa et al. | |
| 2008/0233469 | A1  | 9/2008 | Drozdz et al. | |
| 2009/0142628 | A1* | 6/2009 | Okada | H01M 2/0237 429/8 |
| 2011/0177381 | A1* | 7/2011 | Oya | H01M 2/202 429/158 |

FOREIGN PATENT DOCUMENTS

| | | | | |
|---|---|---|---|---|
| EP | 2008-91183 | | 4/2008 | |
| EP | 2 099 085 | | 9/2009 | |
| JP | 55-169062 | | 5/1979 | |
| JP | 59-86666 | | 6/1984 | |
| JP | 4-108861 | | 9/1992 | |
| JP | 2008-091183 | * | 4/2008 | ............. H01M 2/30 |
| WO | 2008/095315 | | 8/2008 | |

OTHER PUBLICATIONS

JP 2008-091183 MT (Japan Apr. 2008).*
Office Action for Chineese Application CN 201010623089.9 MT of Jan. 13, 2014.*
Japaneese Office action for JP2009296705 from Jan. 22, 2014 M.*
Japaneese Office action for JP2009296705 from Mar. 6, 2014 MT.*
Decision to grant a European patent #2339663 from Jul. 25, 2013.*
European Search Report (in English language) issued May 26, 2011 in corresponding European Patent Application No. 10 01 6105.
Office Action issued Sep. 12, 2014 in corresponding Chinese patent application No. 201010623089.9 (with partial English translation).

* cited by examiner

POWER SOURCE APPARATUS HAVING BUS-BARS

BACKGROUND OF THE INVENTION

1. Field of the Invention

The present invention relates to a power source apparatus with a plurality of batteries stacked together, and primarily relates to a battery system used as a power source for a motor that drives a vehicle such as a hybrid car (hybrid vehicle; HV, hybrid electric vehicle; HEV), plug-in hybrid car (plug-in hybrid electric vehicle; PHEV), or electric automobile (electric vehicle; EV).

2. Description of the Related Art

A high-current, high-output voltage battery system used to power a motor that drives a vehicle such as a hybrid car, plug-in hybrid, or electric automobile has a plurality of batteries stacked together and electrically connected to deliver high output. Adjacent battery electrode terminals are connected via bus-bars, and current flows through those bus-bars for electrical connection.

Methods of electrically connecting a plurality of stacked batteries together include series-connection and parallel-connection. Further, those two methods combine as parallel-connected groups of multiple batteries connected in series (multiple series-parallel) and series-connected groups of multiple batteries connected in parallel (multiple parallel-series). When connecting a plurality of batteries, the connection method should be selected according to the performance required from the batteries employed.

If we assume the use of the same number of batteries with the same performance, series-connection results in higher battery voltage than parallel-connection and is primarily suitable for a hybrid car that demands high-power. In contrast, parallel-connection results in higher battery capacity than series-connection and is primarily suitable for an electric automobile that can be driven a long distance with a single battery charge.

Battery capability required for a vehicle such as a plug-in hybrid is between that required for a hybrid car and an electric automobile. Accordingly, series and parallel combinations are used and batteries are connected in multiple series-parallel (parallel-connected groups of multiple batteries connected in series) or multiple parallel-series (series-connected groups of multiple batteries connected in parallel).

Compared with multiple series-parallel connection, multiple parallel-series connection can detect the state of all the batteries with a limited number of battery state detection lines. Further, since voltage variation between parallel-connected batteries is low and since the detection circuitry is not complex, battery and safety-related control can be simplified in a multiple parallel-series connected system. In addition, the number of bus-bars needed to connect individual batteries together is small allowing the number of component parts to be reduced. Consequently, the overall battery structure can be made compact allowing advantageous use in vehicle applications demanding reduced size. Based on these considerations, when there is a choice between multiple series-parallel connection and multiple parallel-series connection, multiple parallel-series connection (series-connected groups of multiple batteries connected in parallel) is often selected.

A bus-bar, which is described below, has been previously developed as a connecting piece to electrically connect battery electrodes together. A rectangular battery has circular cylindrical positive and negative electrode terminals protruding from both ends of its top surface. A bus-bar straddles adjacent rectangular batteries to connect positive and negative electrode terminals (refer to Japanese Laid-Open Patent Publication 2008-91183).

The bus-bar has a shape such as rectangular or elliptical with two identically sized circular holes, and electrode terminals insert through those holes. The electrode terminals that protrude from a rectangular battery are threaded to accept nut attachment. As shown in FIG. 1 of JP 2008-91183, nuts are threaded onto the electrode terminals on top of a bus-bar and tightened to attach the bus-bar to the electrode terminals. A plurality of rectangular batteries is electrically connected in series by the bus-bars.

To connect batteries in a multiple parallel-series configuration consistent with techniques described for series-connection in JP 2008-91183, the following method can be devised. For example, to connect twenty batteries in four series-connected groups of five batteries connected in parallel (five parallel-four series), first groups of five batteries are stacked together with like-polarity electrode terminals lined-up on each side to form four blocks of batteries. Next, the five positive electrode terminals of each block are connected together with a bus-bar provided with five holes. Similarly, the five negative electrode terminals of each block are connected together with a bus-bar provided with five holes to connect the batteries in each block in parallel. At the positions where these four blocks are joined in series, new connecting hardware must be added unfortunately increasing the number of component parts. If the number of component parts is increased, the system has the drawback that assembly becomes more complex, contact resistance problems can develop, and battery output can degrade as a result.

The present invention was developed to resolve the problems described above. Thus, it is an object of the present invention to provide a power source apparatus that can connect battery electrode terminals together in a simple manner for multiple parallel-series connection (series-connected groups of multiple batteries connected in parallel) and improve battery output as well.

SUMMARY OF THE INVENTION

The power source apparatus for the first aspect of the present invention is provided with batteries having positive and negative electrode regions, parallel blocks with batteries stacked together and electrically connected in parallel, multiple parallel-series connected blocks with the parallel blocks electrically connected in series, and bus-bars having a plurality of insertion holes to insert the positive and negative electrode regions and electrically connect the batteries. Batteries in a parallel block are stacked together lining-up positive electrode regions on one side and negative electrode regions on the other side of the parallel block. Parallel blocks in a multiple parallel-series connected block are stacked by sequentially reversing the orientation of each block added to the stack. The bus-bars are integrated pieces that can electrically connect the batteries in a parallel block in parallel as well as electrically connect the parallel blocks in series.

In the power source apparatus for the second aspect of the present invention, the size of the insertion holes in a bus-bar with a plurality of insertion holes can increase gradually in the battery stacking direction.

In the power source apparatus for the third aspect of the present invention, the insertion hole at one end of a bus-bar can be the smallest and insertion hole size can increase gradually towards the other end of the bus-bar.

In the power source apparatus for the fourth aspect of the present invention, the insertion hole at the center of a bus-bar can be the smallest and insertion hole size can increase gradually towards both ends of the bus-bar.

The power source apparatus for the fifth aspect of the present invention can be provided with bus-bars both having the smallest insertion hole at one end with insertion hole size increasing gradually towards the other end, and having the smallest insertion hole at the center with insertion hole size increasing gradually towards both ends.

In the power source apparatus for the sixth aspect of the present invention, the high-current section of a bus-bar can be made thicker than other parts of the bus-bar.

In the power source apparatus for the seventh aspect of the present invention, the high-current section of a bus-bar can be made with more surface area than other parts of the bus-bar.

In the power source apparatus for the eighth aspect of the present invention, a bus-bar can be made entirely of a single material.

In the power source apparatus for the ninth aspect of the present invention, a bus-bar can be formed as a single-piece using clad-material made of dissimilar materials.

In the power source apparatus for the tenth aspect of the present invention, a detection line to detect the battery state can be connected at the smallest insertion hole in a bus-bar.

In the power source apparatus for the eleventh aspect of the present invention, insertion hole size for a bus-bar with a plurality of insertion holes can increase by 0.1 mm for each hole.

As a result of the first aspect of the present invention, bus-bars used in a multiple parallel-series block have an integrated structure that can electrically connect individual batteries in a parallel block in parallel and can also electrically connect individual parallel blocks in series. Therefore, the number of bus-bars needed to connect the batteries together can be reduced, the number of component parts can be reduced, and the number of manufacturing and assembly steps can be reduced.

Consequently, the overall battery structure can be made compact, and the system is advantageously suited for automotive applications that demand small size to fit in a limited space.

As a result of the second aspect of the present invention, the size of the insertion holes provided in a bus-bar having a plurality of insertion holes and used in a multiple parallel-series block can increase gradually in the battery stacking direction. Consequently, the bus-bars are not mechanically stressed and can be easily connected while preventing position shift between the insertion holes and battery electrode regions. Further, since the contact surface area between the batteries and bus-bar connecting regions can be increased to reduce contact resistance and increase the current-carrying capacity from the batteries to the bus-bars, a large increase in output can be attained.

In addition, bus-bar overall insertion hole area is reduced allowing the bus-bar electrical resistance to be reduced and the output to be greatly increased. Furthermore, when bus-bar electrical resistance is reduced, heat generation from bus-bars carrying high-currents can be prevented.

As a result of the third aspect of the present invention, the insertion hole at one end of a bus-bar is smallest and insertion hole size increases gradually towards the other end of the bus-bar. In a parallel block, if the smallest insertion hole is in the high current flow region of the bus-bar, bus-bar electrical resistance can be reduced. This allows bus-bar heat generation to be held to a minimum and output to be increased. Further, as the amount of current flow decreases along the bus-bar, the electrical resistance gradually increases (because insertion hole size gradually increases). Consequently, uniform thermal distribution can be expected throughout the bus-bar.

As a result of the fourth aspect of the present invention, the insertion hole at the center of a bus-bar is smallest and insertion hole size increases gradually towards both ends of the bus-bar. This allows overall bus-bar insertion hole area to be reduced compared to a bus-bar with the smallest insertion hole at one end. Consequently, since the contact surface area between the batteries and bus-bar connecting regions can be increased, output can be further increased.

As a result of the fifth aspect of the present invention, bus-bars are provided both with insertion hole size increasing gradually from one end to the other and with insertion hole size increasing gradually from the center towards both ends. Consequently, this allows optimal bus-bar allocation throughout the system to maximize output for any battery configuration.

As a result of the sixth aspect of the present invention, the high-current section of a bus-bar is made thicker than other parts, and the electrical resistance of the bus-bar itself can be reduced.

As a result of the seventh aspect of the present invention, the high-current section of a bus-bar has more surface area than other parts, and the electrical resistance of the bus-bar itself can be reduced. Furthermore, by increasing the surface area, heat generated by the bus-bar can be more easily dissipated.

As a result of the eighth aspect of the present invention, a bus-bar is made entirely of a single material to simplify manufacturing and gain advantage from the viewpoint of component part commonality.

As a result of the ninth aspect of the present invention, clad-material made of dissimilar materials is used in an integrated single-piece bus-bar that connects parallel blocks in series. When the bus-bar is connected to positive and negative electrode regions made of different materials, the positive and negative electrode regions can be connected to bus-bar regions of like-material. Consequently, galvanic corrosion can be prevented, and the bus-bar and batteries can remain connected in a stable, low-resistance manner over a long time period.

As a result of the tenth aspect of the present invention, a battery state detection line is connected at the smallest insertion hole in a bus-bar. Accordingly, the detection line can be reliably connected to the electrode region in a low-resistance manner, and the state of the batteries can be accurately detected.

As a result of the eleventh aspect of the present invention, bus-bar insertion hole size increases by 0.1 mm for each hole allowing variation in parameters such as the contact surface area to be minimized.

The above and further objects of the present invention as well as the features thereof will become more apparent from the following detailed description to be made in conjunction with the accompanying drawings.

DETAILED DESCRIPTION OF THE INVENTION

The following describes in detail embodiments of the present invention based on FIGS. 1-16.

Figure 1:
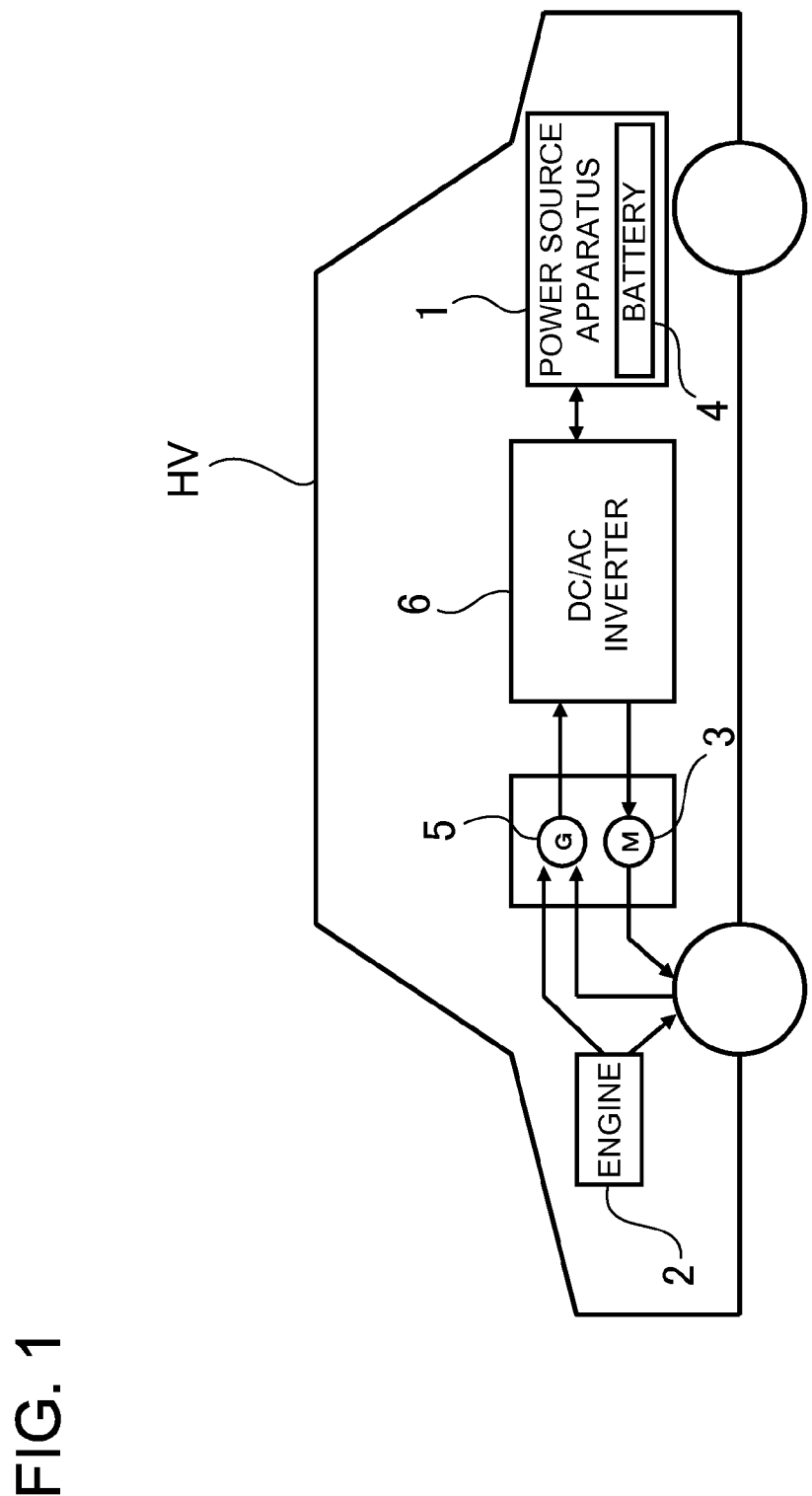
FIG. 1 is a schematic of a hybrid vehicle (vehicle body labeled HV) equipped with the power source apparatus of the present invention.
Figure 2:
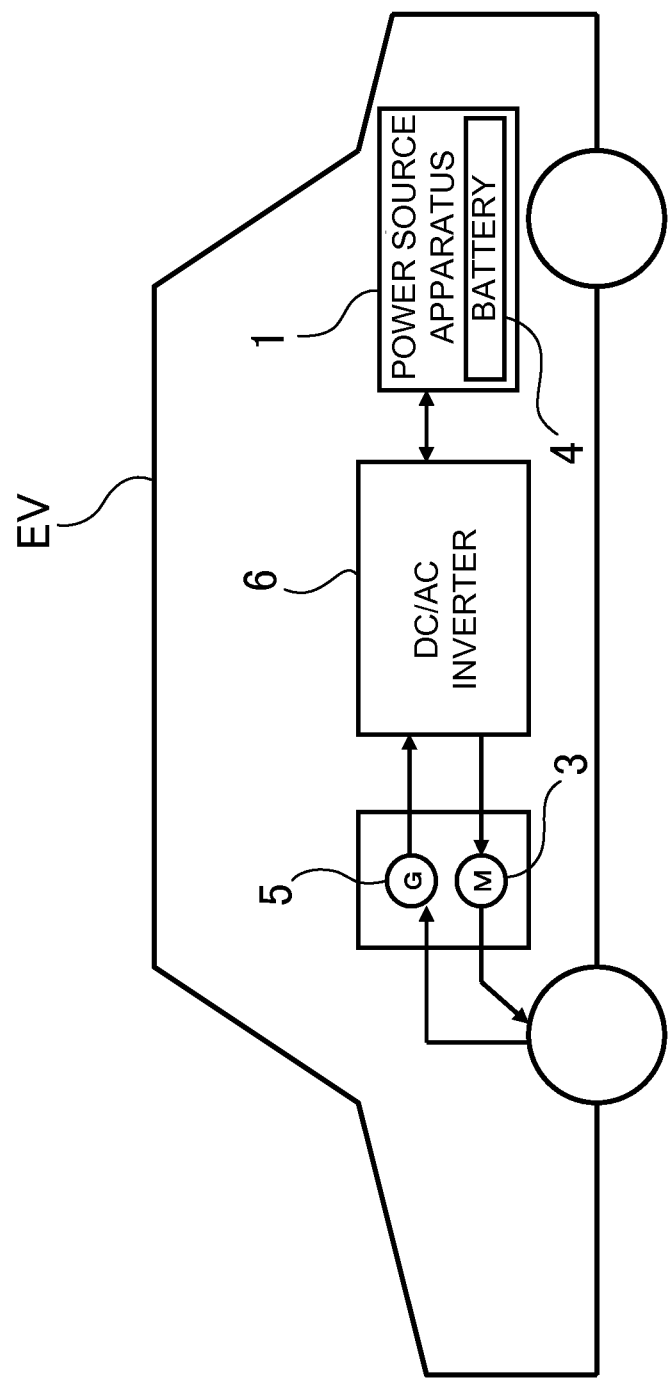
FIG. 2 is a schematic of an electric vehicle (vehicle body labeled EV) equipped with the power source apparatus of the present invention.

Examples of the power source apparatus 1 installed on-board a vehicle are described based on FIGS. 1 and 2.

FIG. 1 shows an example of the power source apparatus 1 installed on-board a hybrid vehicle (vehicle body labeled HV) having a primary engine 2 and motor 3 used in parallel to deliver power to the wheels and drive the vehicle. Since two power sources operate in parallel to drive the wheels of the vehicle in this figure, the drive-train is called parallel hybrid.

The vehicle HV with the power source apparatus 1 on-board is provided with an engine 2 and motor 3 that drive the vehicle HV, a power source apparatus equipped with a battery 4 that supplies electrical power to the motor 3, and a generator 5 that charges rectangular batteries 21 in the power source apparatus battery 4. The power source apparatus is connected to the motor 3 and the generator 5 through a DC/AC inverter 6.

The hybrid vehicle HV is driven by the motor 3 and engine 2 operating together while charging and discharging the power source apparatus battery 4. The engine 2 primarily drives the vehicle, and under given conditions, charges the rectangular batteries 21 in the power source apparatus 1 battery 4. The motor 3 is operated by power supplied from the power source apparatus and operates together with the engine 2 to assist the engine 2 in high load situations such as departure and acceleration. In addition, the motor 3 provides driving power at low speeds, the engine 2 provides driving power at high speeds, and division of the load allows energy efficiency to be increased. Further, the motor 3 operates as a generator 5 during vehicle braking to charge the rectangular batteries 21 in the power source apparatus battery 4.

Besides the parallel hybrid system described above, a hybrid vehicle can also be configured as a series hybrid system or a power-split hybrid system. A series hybrid is driven only by a motor, which is the single source of driving power to the wheels, and an engine is provided to generate electric power that is supplied to the motor. A power-split hybrid combines a separate battery-charging generator with the parallel hybrid system described above to control engine load more precisely and improve energy efficiency compared to the parallel system. The power-split hybrid system is provided with a power-split mechanism that divides the engine's mechanical power between driving the vehicle and operating the generator. The vehicle is efficiently run while controlling the rotational speed (revolutions per minute; RPM) of the generator and the motor using the power-split mechanism. A power-split hybrid is also called a series-parallel hybrid.

Next, FIG. 2 shows an example of the power source apparatus 1 installed on-board an electric vehicle (vehicle body labeled EV) driven only by an electric motor 3. The vehicle EV with the power source apparatus 1 on-board is provided with a driving motor 3 that drives the vehicle EV, a power source apparatus equipped with a battery 4 that supplies electrical power to the motor 3, and a generator 5 that charges rectangular batteries 21 in the power source apparatus battery 4. The power source apparatus 1 is connected to the motor 3 and the generator 5 through a DC/AC inverter 6. The vehicle EV is driven only by the motor 3 while charging and discharging the power source apparatus 1 battery 4. Electrical power is supplied from the power source apparatus 1 to operate the motor 3. The generator 5 is run by energy produced during regenerative braking to charge the previously mentioned rectangular batteries 21 in the power source battery 4.

The first embodiment of the power source apparatus 1 of the present invention, which is installed on-board the vehicles mentioned above, is described in detail based on FIGS. 3-14. However, the vehicle installed with the power source apparatus 1 of the present invention is not limited to the vehicles described above, and can also be a vehicle such as a plug-in hybrid electric vehicle (PHEV).

Figure 3:
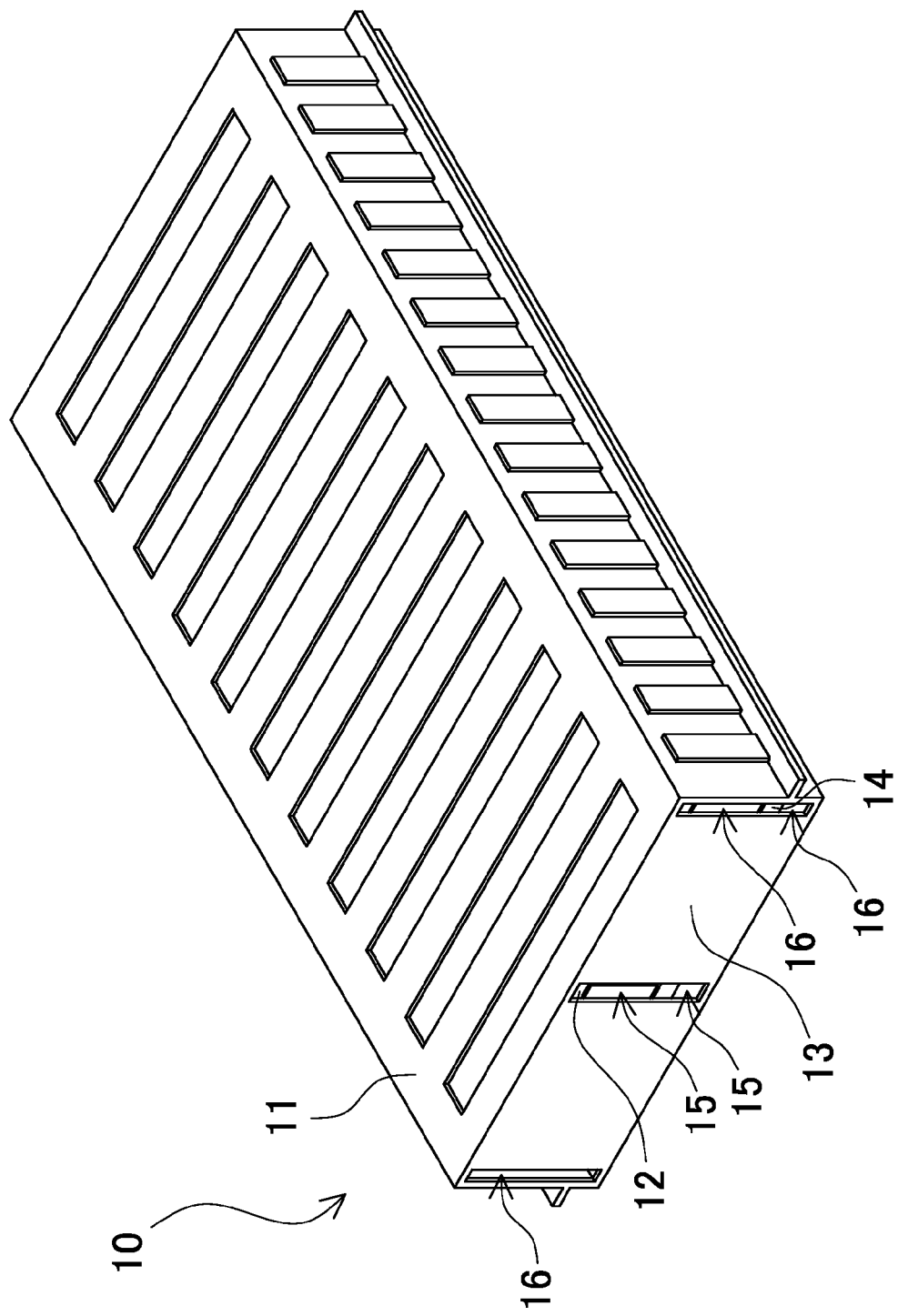
FIG. 3 is a perspective view of the exterior of the battery holding case of the power source apparatus of the present invention.

FIG. 3 shows a perspective view of the exterior of the battery holding case 10 of the power source apparatus 1 of the present invention, which is installed in applications such as on-board a vehicle. The battery holding case 10 houses a battery 4 made up of five parallel-four series battery blocks 20, each of which is four series-connected groups of five batteries connected in parallel as described later. The battery holding case 10 is an enclosure made up of an upper case 11 and a lower case 12 that are formed by working metal material such as aluminum. The battery holding case 10 protects a plurality of five parallel-four series battery blocks 20 from external impact and pressure forces. The upper case 11 covers a plurality of five parallel-four series battery blocks 20 disposed on the lower case 12.

Further, as shown in FIG. 3, an intake opening 15 is provided in the middle of both end-walls 13 of the upper case 11 and both end-walls 14 of the lower case 12. Cooling ventilation flows into the intake openings 15 to initiate cooling of rectangular battery 21. Exhaust openings 16 are provided on both sides of the central intake openings 15. Cooling ventilation flows out of the exhaust openings 16 after cooling the rectangular batteries 21. Cooling ventilation flows into the battery holding case 10 from the intake openings and after circulating through the inside of the battery holding case 10 is discharged to the outside from the exhaust openings 16.

Figure 4:
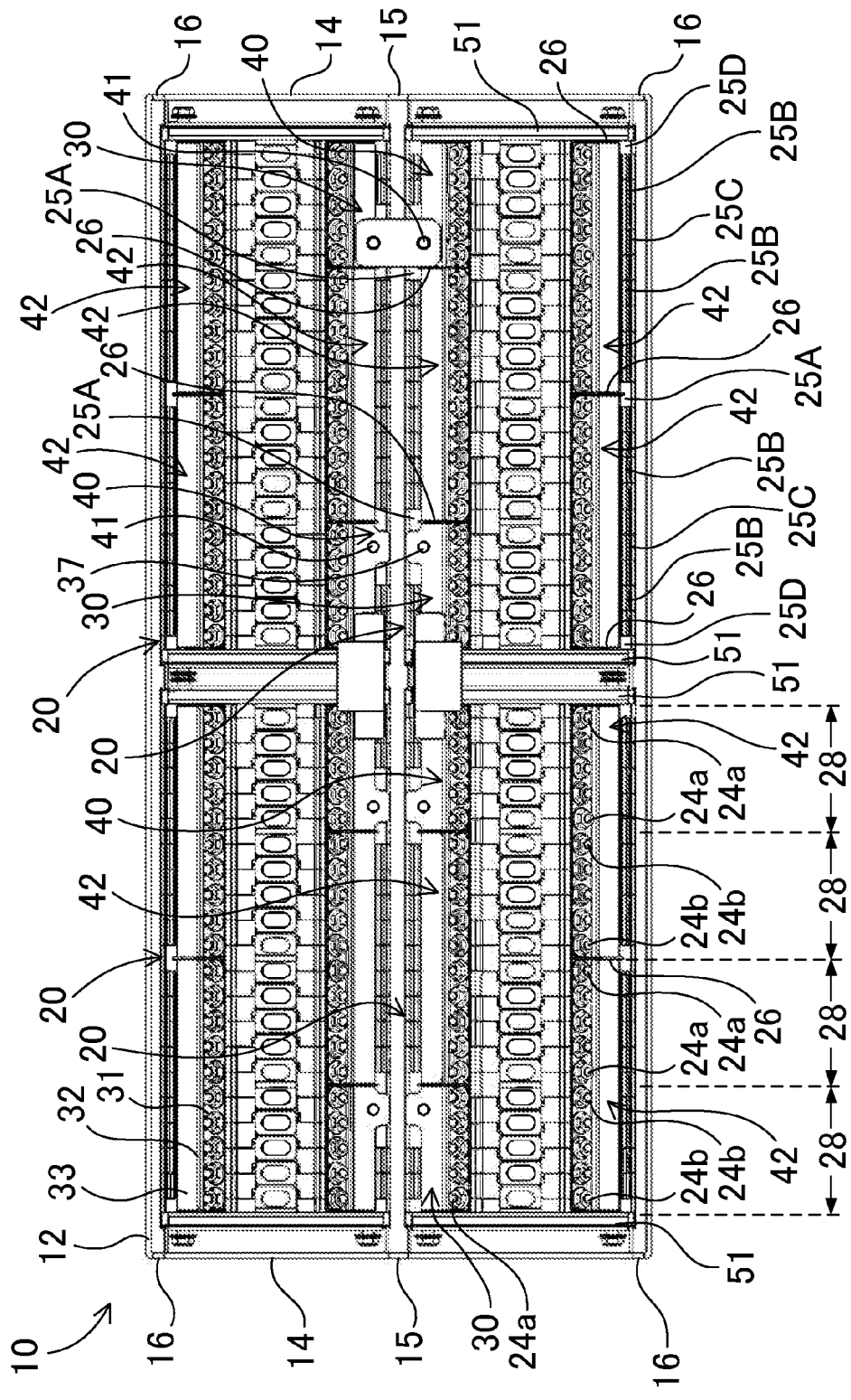
FIG. 4 is a top view showing the internal structure of the battery holding case of the power source apparatus of the present invention.

FIG. 4 shows the lower case 12 of the battery holding case 10 of FIG. 3 viewed from above with the upper case 11 removed, and is a top view that shows the internal structure of the battery holding case 10. Five parallel-four series battery blocks 20 (four series-connected groups of five batteries connected in parallel) are arranged in the lower case 12 in two rows and two columns. The series-connection of those five parallel-four series battery blocks 20 is the battery 4. Accordingly, the power source apparatus battery 4 can be made high output with high capacity, and that battery 4 can supply power to the motor 3 that drives the vehicle.

Figure 5:
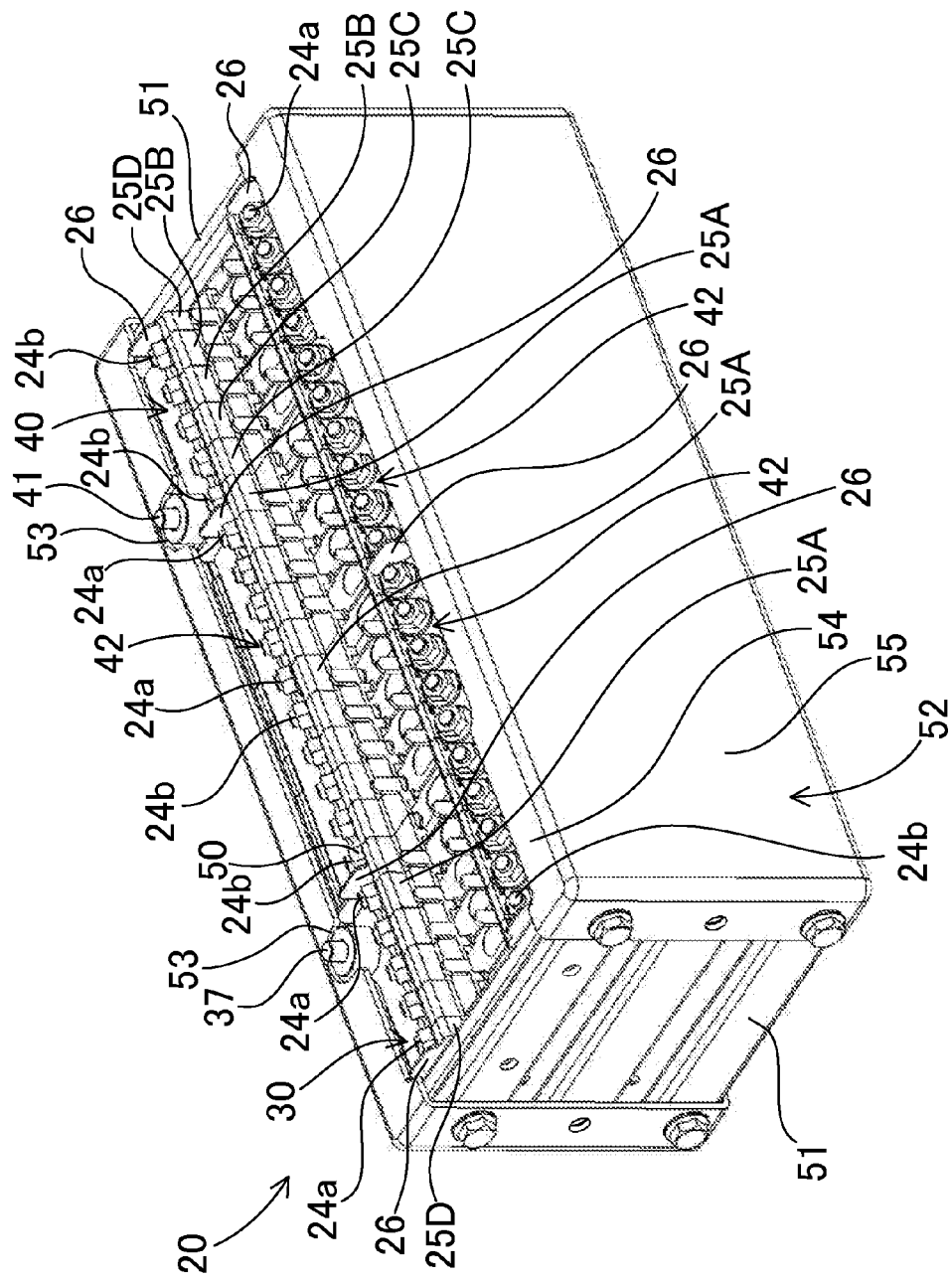
FIG. 5 is a perspective view of the exterior of a five parallel-four series connected (four series-connected groups of five batteries connected in parallel) battery block for the power source apparatus of the present invention.
Figure 6:
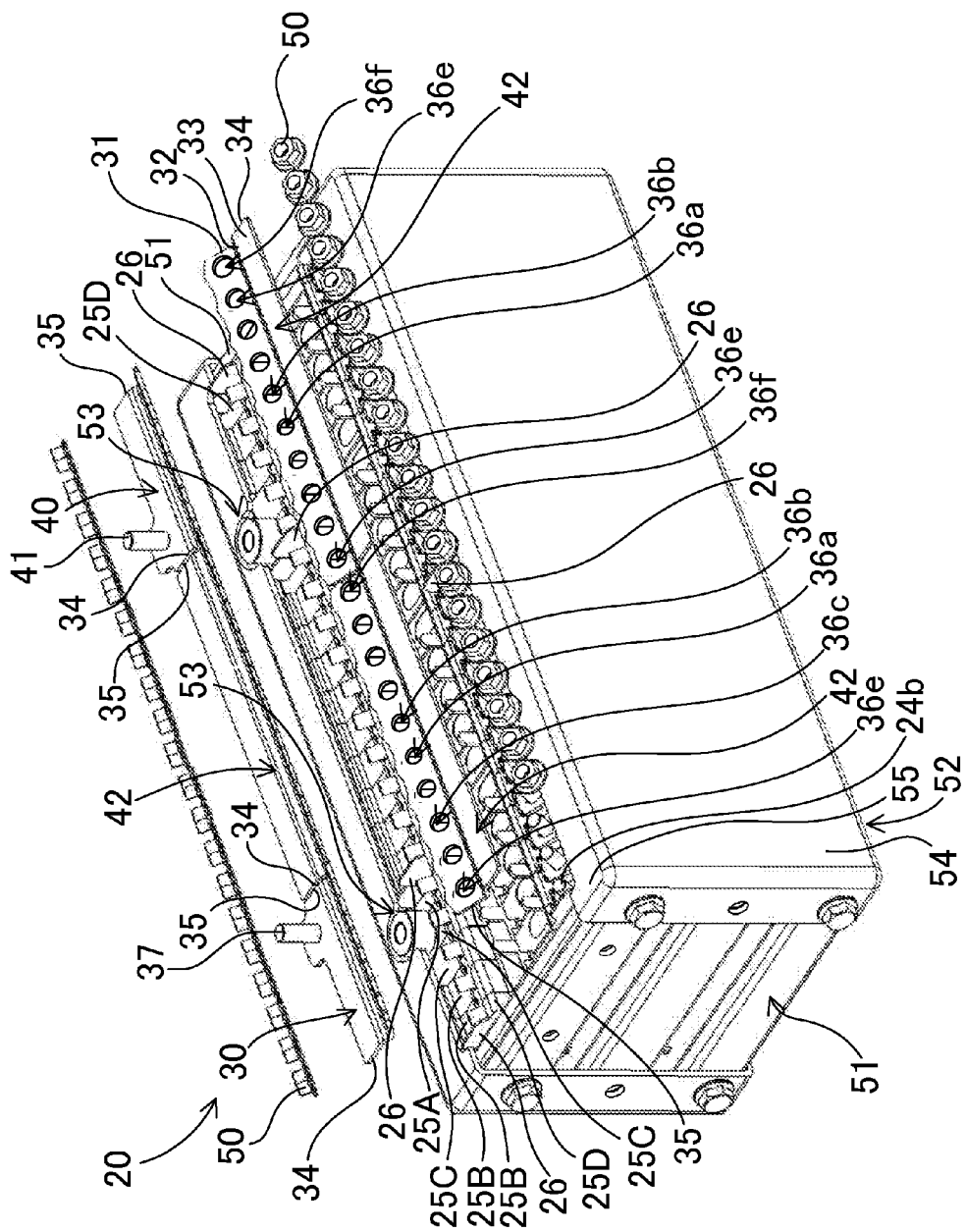
FIG. 6 is an exploded perspective view of the exterior of the five parallel-four series battery block for the power source apparatus of the present invention.

FIG. 5 is a perspective view of the exterior of one of the four five parallel-four series battery blocks 20 shown in FIG. 4. FIG. 6 shows an exploded perspective view of the exterior of the five parallel-four series battery block 20 shown in FIG. 5. The following describes in detail the five parallel-four series battery block (4 series-connected groups of 5 batteries connected in parallel).

Figure 7:
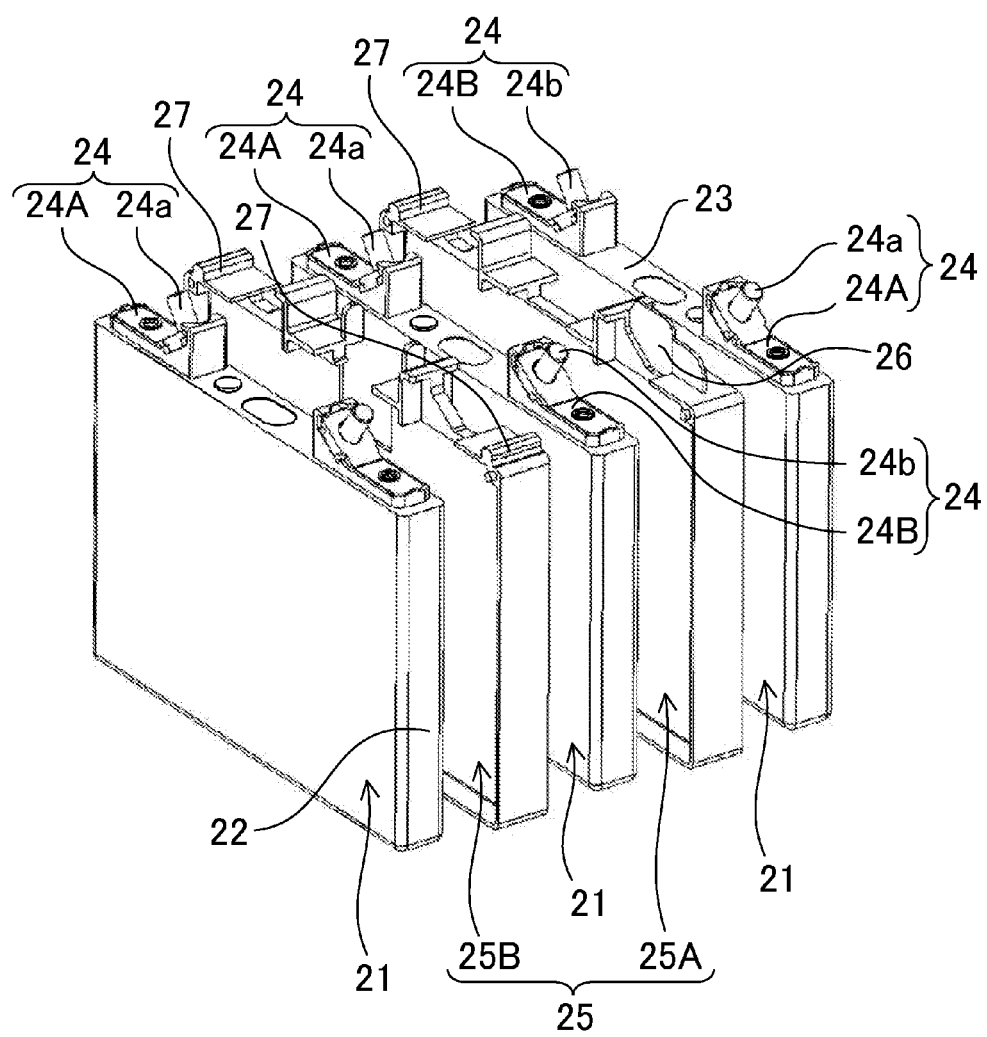
FIG. 7 is an exploded perspective view of the exterior of rectangular batteries and separators stacked for the first embodiment.

A five parallel-four series battery block 20 is a stack of twenty rectangular batteries 21. As shown in FIG. 7, each rectangular battery 21 has a rectangular outline with narrow sides 22. The external case of a rectangular battery 21 is made of metal and the rectangular batteries 21 are stacked together with insulation. Further, the rectangular batteries 21 are lithium ion rechargeable batteries, which have a high capacity for a given weight and volume compared to battery cells such as nickel hydride batteries. Consequently, these lithium ion rectangular batteries 21 are well suited for use in a battery 4 that supplies power to a motor 3 for applications such as in a vehicle where small size and light weight are required.

As shown in FIG. 7, the upper surface 23 of a rectangular battery 21 has electrode regions 24 at each end that are made up of positive and negative electrode terminal surfaces 24A, 24B and positive and negative electrode terminals 24a, 24b. Part of each electrode terminal surface 24A, 24B is inclined to form an acute angle between the electrode terminal surface 24A, 24B and the upper surface 23 of the rectangular battery 21. The electrode terminals 24a, 24b are made in the shape of circular cylinders that project outward in a direction perpendicular to the inclined part of the electrode terminal surfaces 24A, 24B. Electrode terminals 24a, 24b are threaded to allow nuts to be screwed on and tightened. In addition, the upper surface 23 of a rectangular battery 21 is provided with an opening to add electrolyte and a gas discharge valve. As shown in FIG. 7, stacking of the rectangular batteries 21 is accomplished with intervening separators 25.

A separator 25 is made by forming insulating material such as resin in a size essentially equal to that of a rectangular battery 21. Separators 25 cover the surfaces of stacked rectangular batteries 21 to insulate each individual rectangular battery 21, and adjacent separators 25 come in mutual contact. The separators 25 are formed in shapes that prevent position shift of the bus-bars 30, 40, 42 described later. The separators 25 also serve to align the positions of the rectangular batteries 21 and enable the rectangular batteries 21 to be stacked with a constant-interval. The separators 25 are provided with passageways such as cooling channels (not illustrated) to cool the rectangular batteries 21.

Four types of separators 25 are used in the first embodiment. First, the separator 25 positioned towards the rear (right) in FIG. 7 is a first separator 25A and has an insulating plate 26. The insulating plate 26 is provided at only one end of the upper surface of the first separator 25A. By providing an insulating plate 26, adjacent bus-bars 30, 40, 42 can be insulated from one another and bus-bar contact and short circuit due to conditions such as vibration can be prevented. The other end of the upper surface of the first separator 25A is provided with a projecting piece 27.

Next, the separator 25 positioned towards the front (left) in FIG. 7 is a second separator 25B, and the upper surface of the second separator 25B is provided with projecting pieces 27 at both ends. A second separator 25B with a projecting piece 27 provided at only one end is a third separator 25C. A separator 25 with insulating plates 26 at both ends of the upper surface is a fourth separator 25D and is disposed next to an endplate 51 described later. Fourth separators 25D are disposed at both ends of a five parallel-four series battery block 20.

Second separators 25B and third separators 25C are arranged to fit with the shapes of the bus-bars 30, 40, 42 and align the bus-bars 30, 40, 42 in positions allowing them to be solidly connected. Consequently, stress on parts such as the electrode terminals 24a, 24b and bus-bars 30, 40, 42 due to conditions such as vibration can be reduced. Further, since the nuts 50 used to attach the bus-bars 30, 40, 42 are less likely to loosen, short circuits inside the battery 4 can be prevented, and this has the effect that battery performance can be maximized over the long-term.

A five parallel-four series battery block 20 is made up of four parallel blocks 28. A parallel block 28 is five rectangular batteries 21 stacked together with intervening separators 25 and electrically connected in parallel. The parallel block 28 has rectangular batteries 21 stacked in a manner that lines-up positive electrode terminals 24a on one side of the upper surface of the parallel block 28 and lines-up negative electrode terminals 24b on the other side. The positive electrode terminals 24a of the five rectangular battery 21 stack are connected with a first bus-bar 30, and the negative electrode terminals 24b are connected with a second bus-bar 40 to achieve parallel electrical connection. The first bus-bar 30 and second bus-bar 40 are described in detail later.

As shown in FIGS. 5 and 6, a five parallel-four series battery block 20 is made up of four parallel blocks 28 with each parallel block 28 rotated laterally 180° with respect to the previously stacked parallel block 28 to connect the four parallel blocks 28 in series. The upper surface of the five parallel-four series battery block 20 has parallel blocks 28 stacked with a 180° (2-fold) rotational symmetry relation maintained at the intersection of each pair of parallel blocks 28. Specifically, two adjacent parallel blocks 28 are stacked in a manner that lines-up five positive electrode terminals 24a and five negative electrode terminals 24b in a single line. At locations that electrically connect four parallel blocks 28 in series by connecting a line of five positive electrode terminals 24a and five negative electrode terminals 24b, that total of ten positive and negative electrode terminals 24a, 24b are all connected together by a third bus-bar 42.

Figure 8:
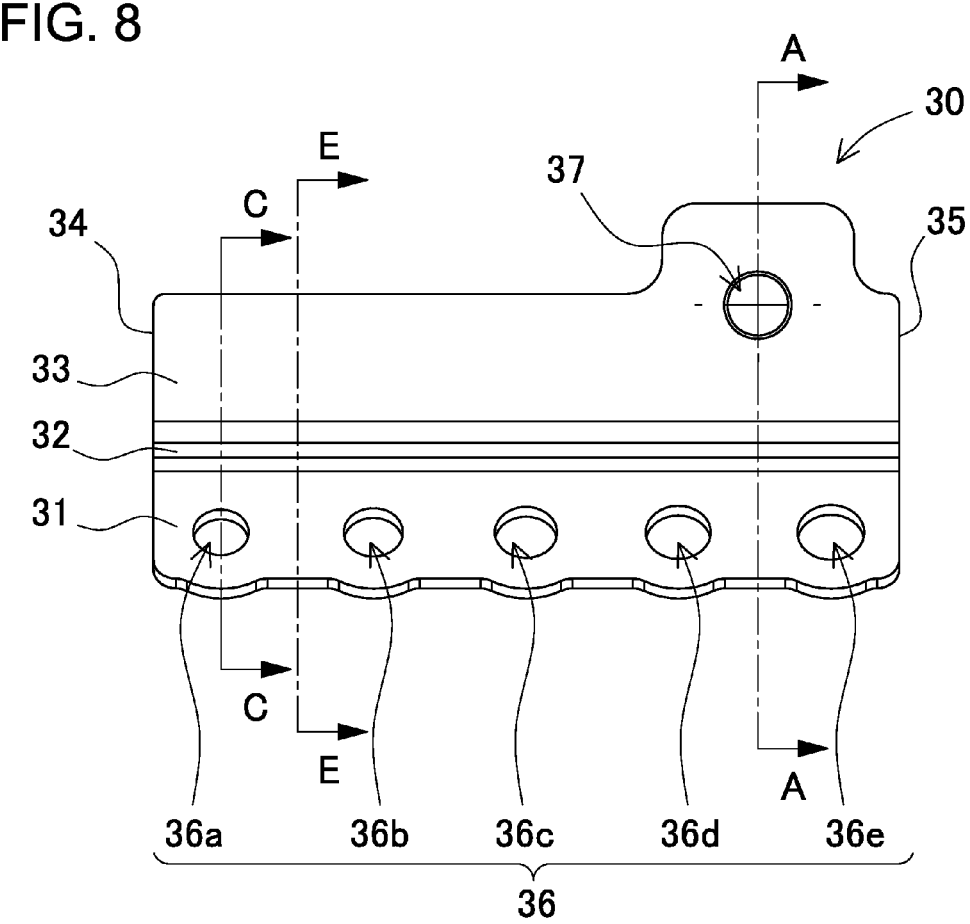
FIG. 8 is a top view of the first bus-bar for the first embodiment.
Figure 9:
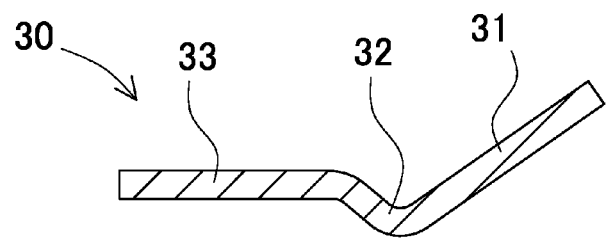
FIG. 9 is a cross-sectional view through the line E-E in FIG. 8.
Figure 10:
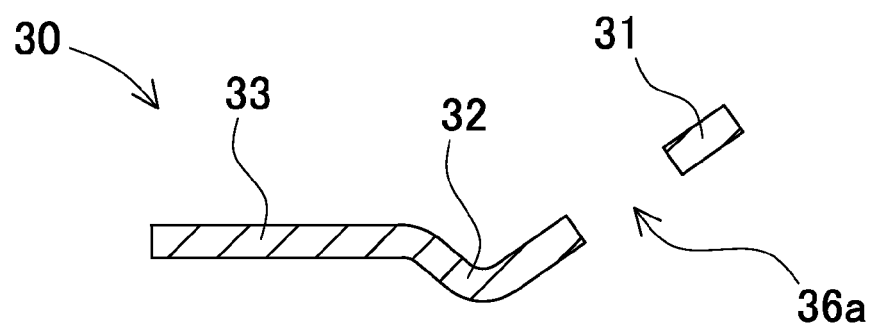
FIG. 10 is a cross-sectional view through the line C-C in FIG. 8.
Figure 11:
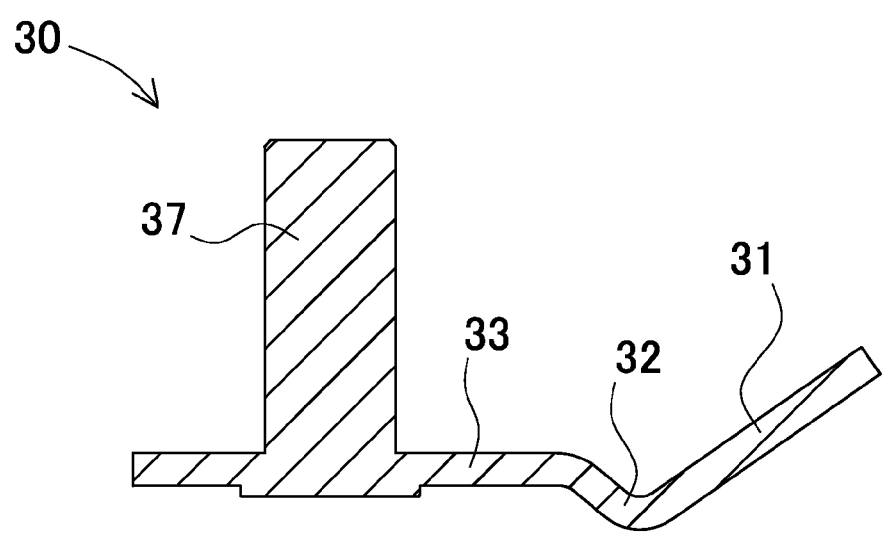
FIG. 11 is a cross-sectional view through the line A-A in FIG. 8.
Figure 12:
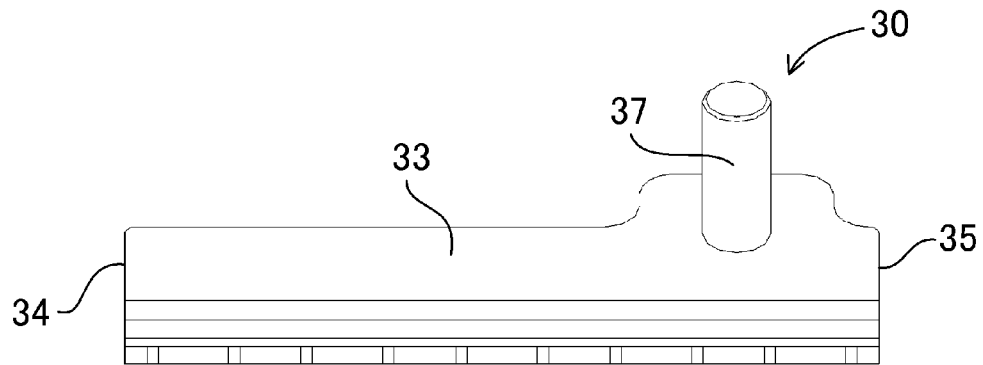
FIG. 12 is a side view of the first bus-bar for the first embodiment.

The following describes the first bus-bar 30, the second bus-bar 40, and the third bus-bar 42 based on FIGS. 5-16. First, FIG. 8 shows a top view of the first bus-bar 30, and cross-sections taken at lines E-E, C-C, and A-A are shown in FIGS. 9-11. The first bus-bar 30 is the bus-bar disposed at the rear-left side of FIG. 6. FIG. 12 shows a side view of the first bus-bar 30 as viewed from above the center of the upper surface 23 of a rectangular battery 21.

The first bus-bar 30 shown in FIG. 8 is made from a metal such as pure copper, has a thin-plate that is basically rectangular shape, and is press-formed into a shape that conforms to the inclined parts of the electrode terminal surfaces 24A, 24B and the separators 25 that cover the rectangular batteries 21. Accordingly, the first bus-bar 30 is formed with an inclined region 31, a bent region 32, and a planar region 33. By providing a bent region 32, the position of the first bus-bar 30 can be aligned by the separators 25. The inclined region 31 is provided with five insertion holes 36 in a straight-line arrangement to accept insertion of five positive electrode terminals 24a. Further, the surface area of the inclined region 31 around each insertion hole 36 is increased compared to locations with no insertion hole 36 to increase the cross-sectional area of the first bus-bar 30 in the vicinity of each insertion hole 36.

FIG. 9 is a cross-section at line E-E where no insertion hole 36 is opened through the first bus-bar 30. In contrast, FIG. 10 is a cross-section at line C-C where an insertion hole 36 is established. As described above, by locally varying the surface area of the inclined region 31 depending on whether or not an insertion hole 36 is present, the cross-sectional areas shown in FIGS. 9 and 10 can be made approximately equal. This allows the electrical resistance of the first bus-bar 30 itself to be made more uniform. As a result, current can flow smoothly (current density can be made more uniform) through the first bus-bar 30, battery 4 output can be increased, and battery 4 performance can be maximized.

The insertion hole 36 closest to one end 34 of the first bus-bar 30 is the first insertion hole 36a and is made with a diameter of 5.1 mm. The size of the first insertion hole 36a is set to a size that is only slightly larger than the inserted positive electrode terminal 24a. The diameter of the other insertion holes 36 increases at each hole by 0.1 mm from the reference size of the first insertion hole 36a at one end 34 of the first bus-bar 30 towards the other end 35. Specifically, in order from one end 34 of the first bus-bar 30, a first insertion hole 36a with a diameter of 5.1 mm, a second insertion hole 36b with a diameter of 5.2 mm, a third insertion hole 36c with a diameter of 5.3 mm, a fourth insertion hole 36d with a diameter of 5.4 mm, and a fifth insertion hole 36e with a diameter of 5.5 mm are established.

Since pure copper used in the first bus-bar 30 has low electrical resistance compared to other metals such as common grades of copper, the electrical resistance of the first bus-bar 30 itself can be reduced. Further, by changing the hole diameter at each insertion hole 36, overall insertion hole area can be reduced compared to prior art with the same hole diameter at all insertion holes. If the insertion hole area is reduced (by reducing hole diameter overall), the contact surface area increases between positive electrode terminal surfaces 24A and the first bus-bar 30 to reduce contact resistance and increase the amount of current flow from the rectangular batteries 21 to the first bus-bar 30. This increases battery output and can yield a high capacity battery 4.

By gradually increasing insertion hole diameter while reducing hole diameter overall, positive electrode terminal position shift due to expansion of the stacked rectangular batteries 21 or due to variation in the rectangular batteries 21 or in the assembly process can be tolerated. Consequently, positive electrode terminals 24a can be easily inserted in the first bus-bar 30 and stress is not applied to the first bus-bar 30 as a result of impact forces or vibration.

In the first embodiment, five rectangular batteries 21 are connected in parallel, and compared to prior art arrangement with the same number of rectangular batteries connected in series, a maximum of five times the current flows in the first bus-bar 30. Accordingly, the first bus-bar 30 does not simply join together prior art bus-bars used for series-connection, but rather to increase current-carrying capability, the surface area, thickness, and cross-sectional area of the first bus-bar 30 is increased compared to the prior art bus-bars. The part of the first bus-bar 30 where surface area is mainly increased is in the planar region 33. The planar region 33 faces the upper surfaces of the separators 25.

First bus-bar surface area is increased by providing the planar region 33 and cross-sectional area is increased by making the first bus-bar 30 thicker. Those features interact allowing multiplicative reduction in the electrical resistance of the body of the bus-bar, and allowing the current-carrying capability to be increased in the first bus-bar 30, which carries high currents as a result of the parallel connection. Further, as a result of electrical resistance decrease in the body of the first bus-bar 30, heat generation caused by high current flow can be suppressed and adverse thermal effects on the rectangular batteries 21 and separators 25 can be prevented. In addition, by increasing first bus-bar surface area, heat generated can be easily dissipated to prevent overheating.

The first bus-bar planar region 33 shown in FIG. 8 is provided with a positive electrode rod 37, which is disposed at the end 35 of the first bus-bar 30 planar region 33 and connects to the DC/AC inverter 6. The positive electrode rod 37 is formed in a circular cylindrical shape that projects vertically from the planar region 33. Further, the surface area of the planar region 33 around the positive electrode rod 37 is increased by making the planar region 33 wider than where there is no positive electrode rod 37. This increases the cross-sectional area of the first bus-bar 30. FIG. 11 is a cross-sectional view through the line A-A where the positive electrode rod 37 is established.

Since the first bus-bar 30 is connected to the DC/AC inverter 6 by the positive electrode rod 37, high current flows through the first bus-bar 30 in the vicinity of the positive electrode rod 37. However, by widening the surface area of the planar region 33 around the positive electrode rod 37 and increasing the cross-sectional area, the electrical resistance of the body of the bus-bar is lowered and heat generation due to high current flow in the first bus-bar 30 can be controlled. In addition, by increasing the surface area of the first bus-bar 30, heat generated can be easily dissipated to prevent overheating.

Figure 13:
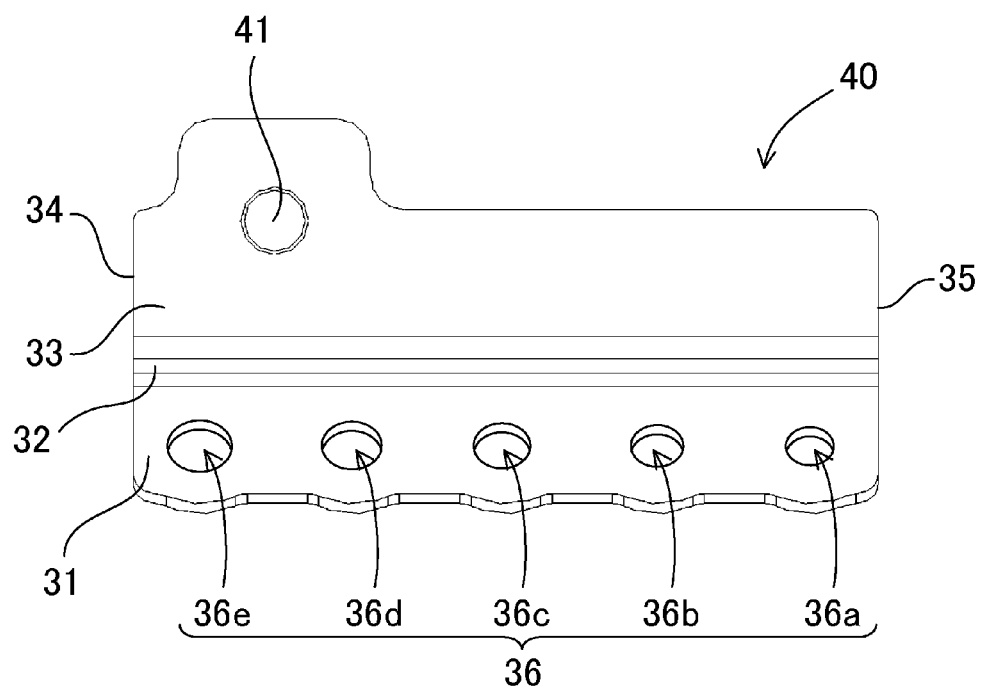
FIG. 13 is a top view of the second bus-bar for the first embodiment.
Figure 14:
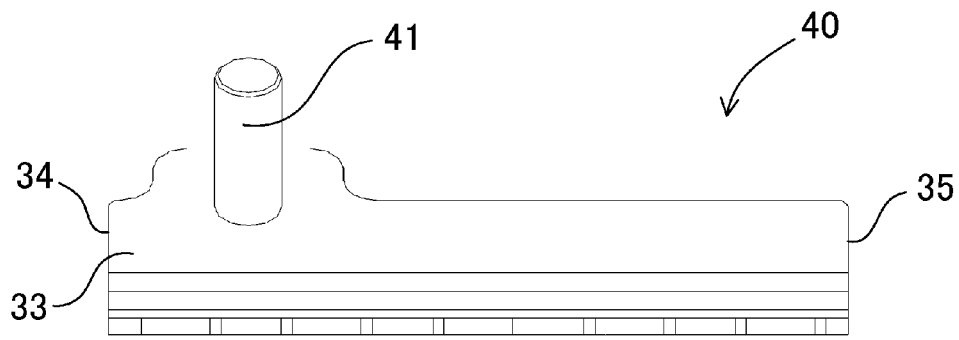
FIG. 14 is a side view of the second bus-bar for the first embodiment.

Next, FIG. 13 shows a top view of the second bus-bar 40. The second bus-bar 40 is the bus-bar disposed at the rear-right side of FIG. 6, and FIG. 14 shows a side view of the second bus-bar 40 as viewed from above the center of the upper surface 23 of a rectangular battery 21. Only parts of the second bus-bar 40 that are different from the first bus-bar 30 are described below.

The inclined region 31 of FIG. 13 is provided with five insertion holes 36 in a straight-line arrangement to accept insertion of five negative electrode terminals 24b. The first insertion hole 36a, which is the 5.1 mm reference hole, is the hole opened closest to the end 35 of the second bus-bar 40 instead of the hole closest to the opposite end 34 as in the first bus-bar 30. The diameter of the other insertion holes 36 increases at each hole by 0.1 mm from the reference size of the first insertion hole 36a towards the end 34 of the second bus-bar 40. Specifically, in order from the end 35 of the second bus-bar 40, a first insertion hole 36a with a diameter of 5.1 mm, a second insertion hole 36b with a diameter of 5.2 mm, a third insertion hole 36c with a diameter of 5.3 mm, a fourth insertion hole 36d with a diameter of 5.4 mm, and a fifth insertion hole 36e with a diameter of 5.5 mm are established. Further, a negative electrode rod 41 is disposed at the end 34 of the second bus-bar 40 instead of a positive electrode rod 37 at the opposite end 35 of the first bus-bar 30.

Based on the second bus-bar structure described above, effects and features equivalent to those of the first bus-bar can be expected. Since the contact surface area between negative electrode terminal surfaces 24B and the second bus-bar 40 is increased, contact resistance is reduced to increase the amount of current flow from the rectangular batteries 21 to the second bus-bar 40. This increases battery output and can yield a high capacity battery 4. By gradually increasing insertion hole diameter while reducing hole diameter overall, negative electrode terminal position shift due to expansion of the stacked rectangular batteries 21 or due to variation in the rectangular batteries 21 or in the assembly process can be tolerated. Consequently, negative electrode terminals 24b can be easily inserted in the second bus-bar 40 and stress is not applied to the second bus-bar 40 as a result of impact forces or vibration.

Further, the second bus-bar 40 is connected to the DC/AC inverter 6 by the negative electrode rod 41, and high current flows through the second bus-bar 40 in the vicinity of the negative electrode rod 41. However, by widening the surface area of the planar region 33 around the negative electrode rod 41 and increasing the cross-sectional area, the electrical resistance of the body of the bus-bar is lowered and heat generation due to high current flow in the second bus-bar 40 can be controlled. In addition, by increasing second bus-bar surface area, heat generated can be easily dissipated to prevent overheating.

Figure 15:
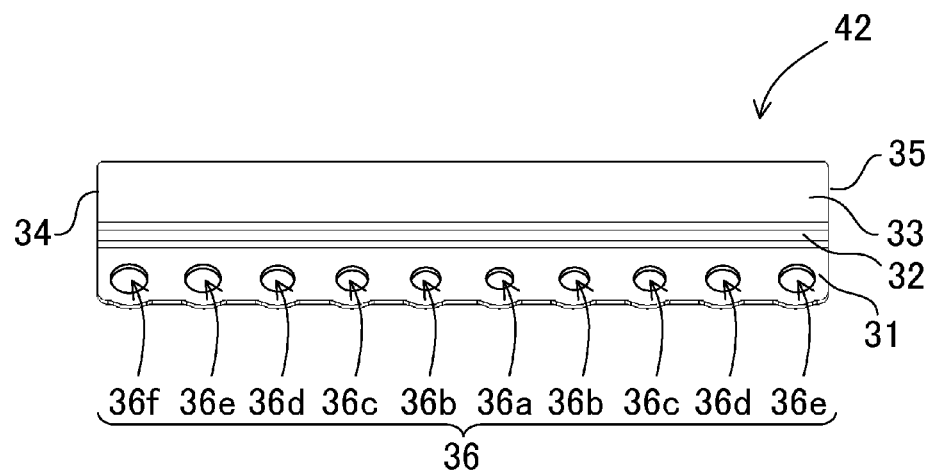
FIG. 15 is a top view of the third bus-bar for the first embodiment.
Figure 16:
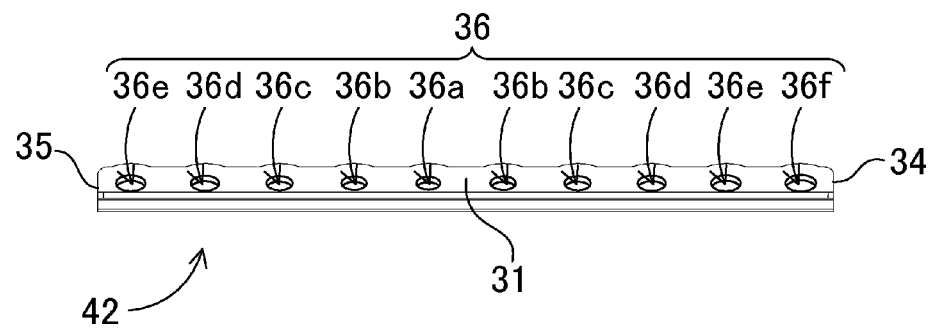
FIG. 16 is a side view of the third bus-bar for the first embodiment.

Next, FIG. 15 shows a top view of the third bus-bar 42. Third bus-bars 42 are disposed at the rear-center, the front-left and front-right sides of FIG. 6, and FIG. 16 shows a side view of the third bus-bar 42 as viewed from the side-wall 55 of a binding plate 52, which is described later. Only parts of the third bus-bar 42 that are different from the first bus-bar 30 are described below.

The inclined region 31 is provided with ten insertion holes 36 in a straight-line arrangement to accept insertion of five positive electrode terminals 24a and five negative electrode terminals 24b. Accordingly, the length of the third bus-bar 42 in the rectangular battery stacking direction is approximately twice that of the first bus-bar 30. The following describes the third bus-bar 42, which is disposed adjacent to the first bus-bar 30 in FIG. 6, as an example. The first insertion hole 36a, which is the 5.1 mm reference hole, is one of the two insertion holes 36 located at the center of the third bus-bar 42. Of the two center insertion holes 36, the first insertion hole 36a is the hole closest to the second bus-bar 40, namely the hole closest to the end 35 of the third bus-bar 42. Insertion hole diameter increases by 0.1 mm at each hole from the first insertion hole 36a towards both ends 34, 35 of the third bus-bar 42.

Specifically, in order from the first insertion hole 36a towards the end 35 of the third bus-bar 42, a second insertion hole 36b with a diameter of 5.2 mm, a third insertion hole 36c with a diameter of 5.3 mm, a fourth insertion hole 36d with a diameter of 5.4 mm, and a fifth insertion hole 36e with a diameter of 5.5 mm are established. Further, in order from the first insertion hole 36a towards the opposite end 34 of the third bus-bar 42, a second insertion hole 36b with a diameter of 5.2 mm, a third insertion hole 36c with a diameter of 5.3 mm, a fourth insertion hole 36d with a diameter of 5.4 mm, a fifth insertion hole 36e with a diameter of 5.5 mm, and a sixth insertion hole 36f with a diameter of 5.6 mm are established. In addition, where the first bus-bar 30 has a positive electrode rod 37, the third bus-bar 42 has nothing, and as a result planar region 33 of the third bus-bar 42 is truly planar with no protrusions. If this third bus-bar 42 is rotated laterally 180°, it becomes one of the two third bus-bars 42 disposed in the front part of FIG. 6.

By making one of the two center insertion holes 36 the smallest diameter first insertion hole 36a, overall insertion hole 36 diameter (overall insertion hole 36 area) can be reduced. The insertion hole 36 closest to the end 34 of the third bus-bar 42 can also be the smallest diameter first insertion hole 36a. However in that case, the insertion hole 36 closest to the opposite end 35 of the third bus-bar 42 becomes a large diameter of 6.0 mm reducing contact surface area and inducing contact resistance problems. Consequently, that insertion hole arrangement is undesirable.

From the description above, since the contact surface area between positive and negative electrode terminal surfaces 24A, 24B and the third bus-bar 42 is increased, contact resistance is reduced to increase the amount of current flow from the rectangular batteries 21 to the third bus-bar 42. This increases battery output and can yield a high capacity battery 4. By gradually increasing insertion hole diameter while reducing hole diameter overall, positive and negative electrode terminal 24a, 24b position shift due to expansion of the stacked rectangular batteries 21 or due to variation in the rectangular batteries 21 or in the assembly process can be tolerated. Consequently, positive and negative electrode terminals 24a, 24b can be easily inserted in the third bus-bar 42 and stress is not applied to the third bus-bar 42 as a result of impact forces or vibration.

The third bus-bar 42 is formed as a single-piece that can both connect rectangular batteries 21 in parallel as a parallel block 28 and connect parallel blocks 28 in series. Consequently, the third bus-bar 42 can reduce the number of parts compared to a system using other parts in addition to the first bus-bar 30 and second bus-bar 40 to implement series-connection. Further, since the number of manufacturing and assembly steps can be reduced by forming the third bus-bar 42 as an integrated single-piece, it is ideally suited for production in quantity.

As shown in FIG. 6, positive and negative electrode terminals 24a, 24b are inserted through the previously described first through third bus-bars 30, 40, 42 and nuts 50 are tightened onto the positive and negative electrode terminals 24a, 24b for solid attachment and connection as shown in FIG. 5. At the ends of this electrically connected five parallel-four series battery block 20 a pair of endplates 51 is disposed via a pair of intervening fourth separators 25D. The endplates 51 are made of metal such as aluminum and are insulated from the rectangular batteries 21 via the fourth separators 25D, which are made of insulating material such as resin. Further, since the endplates 51 do not contact the first through third bus-bars 30, 40, 42 because of the insulating plates 26 provided on the fourth separators 25D, short circuits can be prevented.

The binding plates 52 are fastening components that apply pressure to the pair of endplates 51 at the ends of the five parallel-four series battery block 20 and hold the rectangular batteries 21 in the five parallel-four series battery block 20 with a strong restraining force. The binding plates 52 are formed to fit onto both side surfaces and cover both sides of the five parallel-four series battery block 20. The binding plates 52 and endplates 51 are fastened together by screws. Further, cut-outs 53 are provided in the binding plate 52 that restrains the first bus-bar 30 and second bus-bar 40. These cut-outs 53 are provided to allow the positive electrode rod 37 on the first bus-bar 30 and the negative electrode rod 41 on the second bus-bar 40 to protrude out from the upper surface 54 of the binding plate 52. In addition, cut-out regions (not illustrated) are established through the sidewalls 55 of the binding plates 52 for coolant flow.

In the first embodiment, voltage detection lines (not illustrated) to detect the state of the rectangular batteries 21 are connected to positive and negative electrode terminals 24a, 24b inserted through the first insertion hole 36a in the first through third bus-bars 30, 40, 42, respectively. The first insertion hole 36a is the smallest hole with a diameter of 5.1 mm, and the contact surface area between each bus-bar 30, 40, 42 and the electrode terminal surfaces 24A, 24B are the largest at the first insertion hole 36a. Consequently, the state of the rectangular battery 21 can be accurately detected under low resistance conditions at the first insertion holes 36a. Further, when the contact surface area is large, the nuts 50 can tightly attach each bus-bar 30, 40, 42. This allows the state of the rectangular batteries 21 to be stably detected over a long period allowing the rectangular batteries 21 to be effectively controlled and allowing the battery 4 to be maintained under optimum conditions.

Five parallel-four series battery blocks 20 as described above are arranged in rows and columns as shown in FIG. 4. In FIG. 4, five parallel-four series battery blocks 20 are arranged to dispose first bus-bars 30 and second bus-bars 40 at the center of the battery holding case 10, and connectors are used to connect the four five parallel-four series battery blocks 20 in series. Here, the two first bus-bars 30 and the two second bus-bars 40 at the center of the battery holding case 10 can also be replaced by two third bus-bars 42 to eliminate the connectors. In addition, instead of the connector that connects the two right-most five parallel-four series battery blocks 20 in series, the first bus-bar 30 and second bus-bar 40 can also be formed as a single integrated piece to reduce the number of component parts.

In the five parallel-four series battery block 20 of FIG. 5, the positive electrode rod 37 provided on the first bus-bar 30 and the negative electrode rod 41 provided on the second bus-bar 40 are positioned at the ends of the bus-bars closest to the center of the five parallel-four series battery block 20. As a result, the cut-outs in the upper surface 54 of the binding plate can be established towards the center of the five parallel-four series battery block 20. This cut-out 53 arrangement allows binding plate 52 strength to be maintained compared to cut-outs 53 established at the corners of the upper surface 54 of the binding plate 52 (near the endplates 51).

Further, for bus-bars connected to opposite ends of the same rectangular battery 21 in the five parallel-four series battery block 20 of FIG. 5, the largest diameter insertion hole 36 is opposite the smallest diameter insertion hole 36, and the second largest insertion hole 36 is opposite the second smallest diameter insertion hole 36. Specifically, the sum of the diameters of the two opposing insertion holes 36 in bus-bars connected to the same rectangular battery 21 is either 10.6 mm, 10.7 mm, or 10.8 mm. This equalizes the sum of opposing insertion hole diameters within the small range of 10.6 mm-10.8 mm. Consequently, contact resistance variation among all the rectangular batteries stacked in the five parallel-four series battery block can be suppressed, and the rectangular batteries 21 can be effectively controlled.

For rectangular batteries 21 stacked in each parallel block 28, the sum of the diameters of the insertion holes in opposing bus-bars connected to the same rectangular battery 21 is essentially equal for all the rectangular batteries 21. This allows uniform distribution of (small variation in) contact resistance among the rectangular batteries 21. In a parallel block 28, the state of all the parallel-connected rectangular batteries 21 is assumed the same and battery control is performed based on detection of the state of only one rectangular battery 21. Therefore, the smaller the variation in rectangular battery contact resistance, the more effectively all the rectangular batteries 21 can be controlled. Accordingly, the battery 4 can be maintained in an optimal state.

Next, the second embodiment of the present invention is described. Here, component parts that are the same as the first embodiment are labeled with the same part number and their description is omitted.

In the second embodiment, the insertion holes 36 provided in the first bus-bar 30 and second bus-bar 40 of the first embodiment are changed. First, the insertion hole 36 located at the center of the first bus-bar 30 is made the 5.1 mm first insertion hole 36a. Insertion hole diameter is increased by 0.1 mm at each hole from the reference first insertion hole 36a towards both ends 34, 35. Specifically, in order from the first insertion hole 36a towards one end 34, a second insertion hole 36b with a diameter of 5.2 mm, and a third insertion hole 36c with a diameter of 5.3 mm are established. In order from the first insertion hole 36a towards the other end 35, a second insertion hole 36b with a diameter of 5.2 mm, and a third insertion hole 36c with a diameter of 5.3 mm are also established. The second bus-bar 40 of the second embodiment is provided with same insertion hole arrangement as the first bus-bar 30 of the second embodiment.

In addition to the features and effects realized by the first embodiment, the second embodiment can achieve a smaller bus-bar 30, 40 insertion hole diameter (area) overall by establishing the smallest diameter first insertion hole 36a at the center of the bus-bars 30, 40. Compared to the 5.1 mm to 5.5 mm bus-bar insertion hole diameters in the first embodiment, smaller 5.1 mm to 5.3 mm insertion hole diameters can be achieved in the second embodiment. As a result, contact surface area between the bus-bars 30, 40 and the electrode terminal surfaces 24A, 24B can be further increased allowing contact resistance to be reduced. Accordingly, the amount of current flowing from the rectangular batteries 21 to the bus-bars 30, 40 can be increased allowing the output of the battery 4 to be increased.

Next, the third embodiment of the present invention is described. Here also, component parts that are the same as the first embodiment are labeled with the same part number and their description is omitted. In the third embodiment, the thickness of the bus-bars 30, 40, 42, which is uniform in the first embodiment, is varied according to the amount of current flow. Since the parts of the bus-bars 30, 40, 42 with high current flow are thickened to increase the cross-sectional area, electrical resistance in the body of the bus-bar 30, 40, 42 can be reduced and current-carrying capability can be increased. By varying the thickness according to the amount of current flow, bus-bar current flow is made more uniform and battery output can be increased. Further, since bus-bar current flow is made more uniform, bus-bar heat generation also becomes more uniform.

Next, the fourth embodiment of the present invention is described. Here also, component parts that are the same as the first embodiment are labeled with the same part number and their description is omitted. In the fourth embodiment, the surface area of the bus-bars 30, 40, 42 in the first embodiment is varied according to the amount of current flow. The surface area of the parts of the bus-bars 30, 40, 42, where high currents flow, is increased to locally increase the cross-sectional area. Accordingly, the same type of effects achieved by the third embodiment can be expected. In addition, by increasing the surface area, bus-bar heat generation can be easily dissipated allowing more uniform temperature distribution to be attained throughout the bus-bars 30, 40, 42.

Next, the fifth embodiment of the present invention is described. Here also, component parts that are the same as the first embodiment are labeled with the same part number and their description is omitted. In the first embodiment, bus-bars 30, 40, 42 connected to positive and negative electrode terminals 24a, 24b are all made of the same material. In the fifth embodiment, bus-bars 30, 40, 42 are used that are made from the same material as the positive and negative electrode terminals 24a, 24b they connect.

For example, aluminum is used to make the first bus-bar 30 that connects to aluminum positive electrode terminals 24a, and copper is used to make the second bus-bar 40 that connects to copper negative electrode terminals 24b. Further, aluminum-copper clad-material can be used to make the third bus-bar 42. Clad-material is not simply a material that stacks dissimilar metals together, but rather the dissimilar metals are alloyed together in a strongly bonded state at the dissimilar metal junction. Consequently, galvanic corrosion does not occur at the clad-material junction.

By connecting each electrode terminal 24a, 24b with a bus-bar 30, 40, 42 made of the same material, galvanic corrosion can be prevented. Therefore, compared to the first embodiment, bus-bars 30, 40, 42 and electrode terminals 24a, 24b can be electrically connected in a stable, low resistance state over a long time period.

Next, the sixth embodiment of the present invention is described. Here also, component parts that are the same as the first embodiment are labeled with the same part number and their description is omitted. In the sixth embodiment, the positive electrode rod 37 provided on the first bus-bar 30 is established in the planar region 33 opposite the insertion hole 36 closest to one end 34 of the first bus-bar 30. The negative electrode rod 41 provided on the second bus-bar 40 is established in the planar region 33 opposite the insertion hole 36 closest to the other end 35 of the second bus-bar 40. This allows the high current-carrying positive electrode rod 37 to be established where the electrical resistance of the body of the first bus-bar 30 is lowest. Consequently, battery output can be increased. Further, since the high current-carrying negative electrode rod 41 is established where the electrical resistance of the body of the second bus-bar 40 is lowest, battery output can be increased.

In the bus-bars 30, 40 on the five parallel-four series battery block of FIG. 5, the insertion holes 36 where high current flows in the sixth embodiment have the smallest diameter, and the body of the bus-bars 30, 40 has the lowest resistance there. Further, the size of the insertion holes 36 gradually increases where the current flow becomes less. Where only a small current flows in the bus-bars 30, 40, the insertion holes 36 are the largest and electrical resistance in the body of the bus-bars 30, 40 is largest at those locations. Consequently, current can flow smoothly (current density can be made more uniform) through the bus-bars 30, 40, battery output can be increased, and battery performance can be maximized.

Although an air-cooled forced ventilation cooling system (with a blower or fan etc.) is adopted as the battery cooling system in the embodiments of the present invention, the cooling system is not limited to that method of cooling. All types of cooling systems such as an air-cooled forced ventilation negative-pressure (sucking) cooling system, a water-cooling system, or a cooling system that uses a coolant medium can be used. Further, the power source apparatus of the present invention is not limited to the cooling structure in the embodiments, and the power source apparatus can be provided with any variety of cooling structures. The presence or absence, the number, and the positions of intake openings and exhaust openings can be changed at liberty.

The battery configuration is not limited to the configuration in the embodiments. The battery can have a configuration such as a single parallel block with battery cells connected in parallel, or it can be a multiple series-parallel block having parallel-connected groups of multiple battery cells connected in series. All types of battery configurations can be used, and design parameters such as the type of battery cells, the number of stacked battery cells, the stacking method, and the connection method be also be changed at liberty.

Although rectangular lithium ion batteries are used as the batteries in the embodiments, any type of batteries such as nickel hydride batteries, nickel cadmium batteries, or fuel cells can be used as the batteries. Further, batteries of any shape such as circular cylindrical batteries can be used. In addition, the external case of the batteries can be insulating material allowing the batteries to be stacked next to each other in an insulated manner.

Bus-bar attachment is not limited to the method of screw-tightening nuts onto the electrode terminals, and methods such as weld-attachment can also be implemented. There is also no particular limitation on bus-bar material and bus-bars can be changed from pure copper to a lower resistance material. Further, bus-bar shape is not limited to that of the embodiments and all types of bus-bar shapes can be formulated. The presence or absence of electrode rods and their locations, the configuration of various connectors, and other elements are not limited to those of the embodiments, and the bus-bars can be changed to bus-bars optimally suited for the power source apparatus architecture.

The number and size arrangement of the insertion holes established in the bus-bars can be changed to optimal values and arrangements. For example, to more equally distribute resistance among the rectangular batteries, insertion hole size in the second bus-bar can be changed from the first through fifth insertion hole sizes to the second through sixth insertion hole sizes. The first insertion hole in the third bus-bar can be either of the two center insertion holes, and two adjacent insertion holes in the third bus-bar could also be the same size. All possible design changes can be adopted for the insertion holes established in the bus-bars.

Components such as the separators, endplates, and fastening components can be changed according to power source apparatus architecture and cooling method, and are not limited to those of the embodiments. All variety of changes can be proposed, such as changes in number, type, material, and shape. Further, all possible fastening methods other than screw-fastening, such as welding, can also be considered.

Although voltage detection lines are connected to first insertion holes in the first embodiment, other detection lines such as temperature detection lines can also be grouped together and connected. There is also no limitation to detection lines, and other components such as heaters can also be installed. Further, the connection points for voltage detection lines are not limited to the first insertion holes and voltage detection lines can be connected at the most suitable locations.

Finally, although bus-bar insertion hole diameter is varied in the embodiments, an inverse arrangement is also possible where bus-bar insertion hole diameters are all made the same but electrode terminal projecting rod sections are instead varied in size. In addition, instead of providing insulating plates on the separators, insulating plates can also be formed with the bus-bar as a single integrated piece. Component parts in the present embodiments can be changed to conform to all possible design changes made to the power source apparatus.

The present invention can be advantageously utilized as a power source apparatus in vehicles such as a hybrid car (hybrid vehicle; HV, hybrid electric vehicle; HEV), plug-in hybrid (plug-in hybrid electric vehicle; PHEV), or electric automobile (electric vehicle; EV). Further, the present invention can also be favorably used as a power source apparatus in non-automotive applications.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims. The present application is based on Application No. 2009-296705 filed in Japan on Dec. 28, 2009, the content of which is incorporated herein by reference.

What is claimed is:

1. A power source apparatus comprising:
   a plurality of batteries, wherein each of the batteries has a positive electrode terminal and a negative electrode terminal disposed separately on a same surface of the battery;
   a plurality of parallel blocks, each of the parallel blocks having a number of the batteries stacked together and electrically connected in parallel, wherein each of the parallel blocks has a set of the positive electrode terminals lined up at one side and a set of the negative electrode terminals lined up at the other side of a common surface formed by the surfaces of the batteries formed when the batteries are stacked into the parallel block as a single unit,
   wherein the parallel blocks are electrically connected in series to form a plurality of multiple parallel-series connected blocks, and the parallel blocks are stacked to form each of the multiple parallel-series connected blocks having an orientation with respect to a position of the positive electrode terminals and the negative electrode terminals; and
   a plurality of bus-bars including first bus-bars, second bus-bars, and third bus-bars, each of the first bus-bars and each of the third bus-bars having a plurality of insertion holes receiving the positive electrode terminals, and each of the second bus-bars and each of the third bus-bars having a plurality of insertion holes receiving the negative electrode terminals so that the batteries are electrically connected to each other,
   wherein each of the multiple parallel-series connected blocks has two parallel lines of the electrodes spaced apart from each other, and each of the lines of the electrodes is arranged alternately by the set of the positive electrode terminals and the set of the negative electrode terminals in the stacking direction of the batteries,
   wherein the bus bars extend in a stacking direction of the batteries along each of the two lines of the electrodes,
   wherein stacking directions of the batteries of at least two of the multiple parallel-series connected blocks are parallel to each other, the at least two of the multiple parallel-series connected blocks include at least one of the first bus-bars and at least one of the second bus-bars, respectively,
   wherein the at least one of the first bus-bars and the at least one of the second bus-bars are configured to connect to each other at a region where the parallel blocks overlap in a direction perpendicular to the stacking directions,
   wherein at least one of the third bus bars successively lies from the set of the positive electrode terminals to the set of the negative electrode terminals, which are arranged side by side, so that the at least one of the third bus bars electrically connects the batteries in the parallel block in parallel and simultaneously electrically connects the parallel blocks positioned side by side in series.

2. The power source apparatus as cited in claim 1, wherein diameters of the insertion holes in one of the bus-bars increases gradually in the battery stacking direction.

3. The power source apparatus as cited in claim 2, wherein the insertion hole at one end of a bus-bar is the smallest and the diameter of the insertion holes increases gradually towards the other end of the bus-bar.

4. The power source apparatus as cited in claim 2, wherein the insertion hole at a center part of at least one of the bus-bars is the smallest and the diameter of the insertion holes increases gradually towards both ends of the bus-bar.

5. The power source apparatus as cited in claim 2, wherein at least one of the bus-bars has the smallest insertion hole at a center part with the diameter of the insertion holes increasing gradually towards both ends.

6. The power source apparatus as cited in claim 1, wherein a high-current section of at least one of the bus-bars is made thicker than other parts of the bus-bar.

7. The power source apparatus as cited in claim 1, wherein a high-current section of at least one of the bus-bars is made with more surface area than other parts of the bus-bar.

8. The power source apparatus as cited in claim 1, wherein at least one of the bus-bars is made entirely of a single material.

9. The power source apparatus as cited in claim 1, wherein at least one of the bus-bars is formed as a single integrated piece using clad-material made of dissimilar materials.

10. A power source apparatus comprising:
    a plurality of batteries, wherein each of the batteries has a positive electrode terminal and a negative electrode terminal disposed separately on a same surface of the battery;
    a plurality of parallel blocks, each of the parallel blocks having a number of the batteries stacked together and electrically connected in parallel, wherein each of the parallel blocks has a set of the positive electrode terminals lined up at one side and a set of the negative electrode terminals lined up at the other side of a common surface formed by the surfaces of the batteries formed when the batteries are stacked into the parallel block as a single unit,
    wherein the parallel blocks are electrically connected in series to form a plurality of multiple parallel-series connected blocks, and the parallel blocks are stacked to form each of the multiple parallel-series connected blocks having an orientation with respect to a position of the positive electrode terminals and the negative electrode terminals; and a plurality of bus-bars, each of the bus-bars having a plurality of insertion holes receiving the positive electrode terminals and the negative electrode terminals so that the batteries are electrically connected to each other, wherein the each of the multiple parallel-series connected blocks has two parallel lines of the electrodes spaced apart from each other, and each of the lines of the electrodes is arranged alternately by a set of the positive electrode terminals and a set of the negative electrode terminals in the stacking direction of the batteries, wherein the bus bars extend in a stacking direction of the batteries along each of the two lines of the electrodes, and at least one of the bus bars successively lies from the set of the positive electrode terminals to the set of the negative electrode terminals which are arranged side by side so that the bus bar electrically connects the batteries in the parallel block in parallel and simultaneously electrically connects the parallel blocks positioned side by side in series, wherein diameters of the insertion holes in one of the bus-bars increases gradually in the battery stacking direction, and wherein the diameters of the insertion holes in the at least one bus-bar increases by 0.1 mm for each successive hole.

11. The power source apparatus as cited in claim 1, wherein the bus bars, which are adjacent in the stacking direction of the batteries, are insulated from each other.

12. The power source apparatus as cited in claim 1, wherein each of the batteries further comprises a gas discharge valve, and the gas discharge valves are disposed between the bus-bars, which are separately arranged on opposite sides of a surface of each of the multiple parallel-series connected block.

13. The power source apparatus as cited in claim 12, wherein at least one of the first, second and third bus-bars has a planar region that is arranged towards an outside of the gas discharge valves from the insertion holes of the at least one of the bus-bars and is wider than a region of the at least one of the bus-bars that is arranged towards a side of the gas discharge valves from the insertion holes of the at least one of the bus-bars.

14. The power source apparatus as cited in claim 1, wherein at least one of the bus-bars has planar region on one end side of the bus-bar so that the insertion holes of the bus-bar are unevenly distributed on side opposite to the one end.

* * * * *